2 Sheets--Sheet 1.

W. WESTLAKE.

Car-Lamps.

No. 5,860. Reissued May 5, 1874.

WITNESSES:
H. H. Dodge
Jarvis Case

INVENTOR:
Wm. Westlake
by Dodge & Son
Attys.

AM. PHOTO-LITHOGRAPHIC Co. N. Y. (OSBORNE'S PROCESS.)

2 Sheets--Sheet 2.

W. WESTLAKE.

Car-Lamps.

No. 5,860. Reissued May 5, 1874.

WITNESSES:
H. H. Dodge
Jarvis Case

INVENTOR:
Wm Westlake
by Dodge & Son
Attys.

AM. PHOTO-LITHOGRAPHIC Co. N. Y. (OSBORNE'S PROCESS.)

UNITED STATES PATENT OFFICE.

WILLIAM WESTLAKE, OF CHICAGO, ILLINOIS.

IMPROVEMENT IN CAR-LAMPS.

Specification forming part of Letters Patent No. 129,259, dated July 16, 1872; reissue No. 5,860, dated May 5, 1874; application filed September 9, 1873.

*To all whom it may concern:*

Be it known that I, WILLIAM WESTLAKE, of the city of Chicago, in the county of Cook and State of Illinois, have invented certain new and useful Improvements in Car-Lamps, of which the following is a full description, reference being had to the accompanying drawing, consisting of two sheets, and making a part of this specification, in which—

Figure 1:
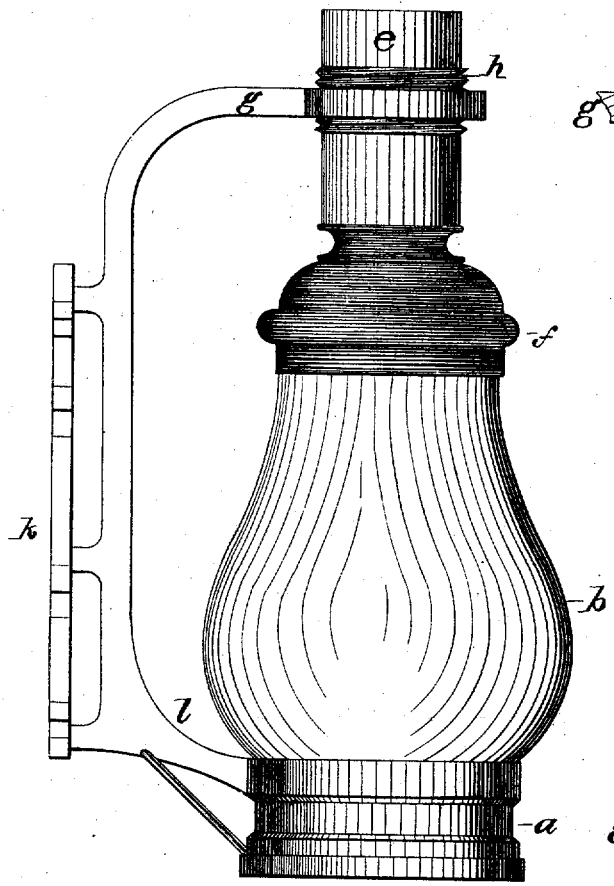
Figure 2:
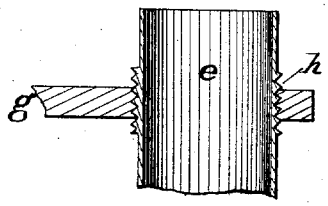
Figure 3:
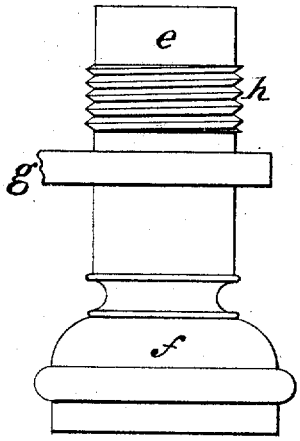
Figure 4:
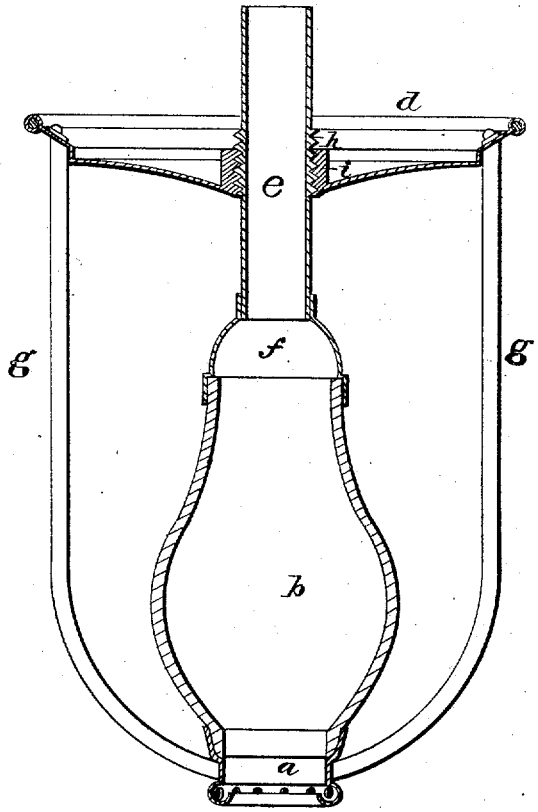

Figure 1 is an elevation of a side lamp; Fig. 2, a detail in section; Fig. 3, a detail; Fig. 4, a vertical section of a center lamp.

The globes of car-lamps have heretofore been plastered in, both at the top and bottom, and when broken it has been necessary to take down the lamp-frame and remove it to a shop to replace the broken globe. The object of my invention is to so construct a car-lamp that the globe will be securely held in place without the use of plaster, and so that, in case of breakage, it can be replaced by any person without removing the lamp-frame.

In the drawing, *a* represents a metal band, in which the globe is supported, and to which the candle-holder or lamp is attached. It is made in the usual manner. *e* is a tube, the lower end of which is enlarged into, or connected with, a cap, *f*, which fits over the top of the globe. The tube *e* is provided with a screw-thread, *h*. *g*, *k*, and *l* form a bracket, and may be cast together, if desired, the part *k* being adapted to be secured to the side of the car in the usual manner. The lower end of *l* is permanently attached to the band *a*. The upper end of *g* encircles the tube *e*, and is provided with a screw-thread corresponding with *h*. The globe *b* is held in place between the parts *a f*, and the tube-cap *e f* can be screwed down upon the globe as tightly as may be desired.

In case of breakage the globe can be replaced by unscrewing the tube *e*, and lifting the cap, as shown in Fig. 3. The globe can also be removed in the same manner, to facilitate cleaning, which will be found of great advantage.

In Fig. 4 the parts *a′ b′ e′ f′* correspond with the like parts in Sheet 1, and the tube *e′* is provided with a screw-thread, *h′*. *d* represents the reflector in common use, and constructed as usual, except that at the center is a screw-thread.

The operation of the parts in this lamp is similar to that already described.

I am aware that hand-lanterns and lamps have been made with detachable globes and chimneys, and also that a car-lamp has been made so that the globe, with its supporting devices, could be removed from the oil-pot; but I am not aware that a car-lamp has ever been made in which the globe was held securely in place at top and bottom, and capable of being entirely detached from its supports, as in my lamp.

Having thus fully described my invention, what I claim is—

The combination, in a car-lamp, of the base or band *a*, provided with suitable supporting devices, for rigid attachment to the body of the car, a globe capable of being detached from its supports, both above and below, and an adjustable top piece for holding the globe in place, and permitting its removal at will, substantially as described.

WILLIAM WESTLAKE.

Witnesses:
E. A. WEST,
O. W. BOND.